Patented Apr. 30, 1935

1,999,995

UNITED STATES PATENT OFFICE 1,999,995

PROCESS FOR THE PREPARATION OF GLYOXAL SULPHATE

Melvin A. Perkins, Milwaukee, Wis., assignor to E. I. du Pont de Nemours & Company, Wilmington, Del., a corporation of Delaware No Drawing. Application November 10, 1933, Serial No. 697,474

4 Claims. (Cl. 260—99.12)

This invention relates to a new and improved process for preparing glyoxal sulphate.

According to German Patent No. 362,743 of 1922, glyoxal sulphate is prepared by slowly adding 65% oleum to tetrachlorethane containing mercury sulphate in suspension. By following the procedure of this German patent, I have found that the yields obtained are only a small fraction of theory. Furthermore, great care must be exercised in adding the oleum due to the fact that the reaction does not start until a certain amount of oleum has been added, and when the reaction starts it tends to proceed violently and is difficult and oftimes impossible to control.

It is an object of my invention to provide a process which will give glyoxal sulphate in high yields, and one which may be readily controlled and the hazards of the known process eliminated.

I have found that by slowly adding tetrachlorethane to strong oleum containing mercury sulphate, and by warming the mass further until reaction is complete, a comparatively high yield reaction of glyoxal sulphate is obtained. The reaction proceeds smoothly and in an easily controllable manner. By using the materials and conditions of German Patent No. 362,743, and reversing the order of adding the materials so that the tetrachlorethane is added to the oleum solution of mercury sulphate, the yields are increased well over 100% of that heretofore obtained.

Still further gains are realized by regulating the time of reaction, temperature, proportion of catalyst and, particularly, ratio of tetrachlorethane to oleum. Based on one part of tetrachlorethane, yields of glyoxal sulphate increase progressively as the proportion of 65% oleum is increased from 2.4 to 6 parts, although the yield increase is relatively small at more than 4 parts of oleum. Temperatures of 45° C. to 66° C. have been found to be operative, although the upper limits of temperature give highest yields. Maximum yields are obtained in an approximately 4-hour reaction period, both shorter and longer reaction periods resulting in loss of yield, although the reaction is not so sensitive to this as to other variables, and from 1½ to 5 hours have been found to give good results. As to the proportion of catalyst, improvement is obtained by reducing the amount to one-half that used in German Patent No. 362,743. We prefer to use 65% oleum, although acids of materially lower $SO_3$ content can also be used, the lower limit being about 25% free anhydride.

The following example is given to illustrate the preferred mode of operation, although it is to be understood that my invention is not to be limited thereby. The parts used are by weight.

1.7 parts of mercurous sulphate are introduced into 400 parts of 65% oleum contained in a glass, enameled, or iron vessel, provided with temperature recorder, inlet tube and small vent (for exit of fumes). The mixture is gradually heated, with stirring, to 55–65° C., and 100 parts of tetrachlorethane are added during the course of about two hours. Since the oleum fumes strongly at first, about 10% of the tetrachlorethane (10 parts) is added during the period of heating the oleum-mercury sulphate mixture to 55°. This reduces the fuming considerably. The remainder (90 parts) of the tetrachlorethane is then added at 55–65°, preferably at 60–65° C. After all of the tetrachlorethane has been added, the charge is further heated and stirred for about two hours at 55–65° C. The crystalline magma is then cooled to 25° C. or below and filtered on a porous stone filter (filtrose). The cake is washed or slurred with 100% sulphuric acid (about 400 parts), filtered if necessary, and finally drowned in ice water, filtered, washed with ice-water and dried, preferably below 80° C. Pure white crystals of glyoxal sulphate are thus obtained, of excellent purity and in yields of 70–73%, based on tetrachlorethane.

The reaction may be carried out equally well in glass or iron vessels, and oleum of the concentrations above described may be used, although oleum of from about 50 to 65% is preferred. In the example, 1.7 to 17 parts of mercurous sulphate can be used, and is equivalent to somewhat larger proportions of mercuric sulphate, which may be substituted therefor. Other catalysts, such as copper sulphate, have also been found to be suitable.

What I claim is:

1. In the process for preparing glyoxal sulphate which comprises reacting tetrachlorethane and oleum in the presence of a catalyst for the reaction, the step which comprises slowly adding tetrachlorethane to oleum of over 25%.

2. In the process for preparing glyoxal sulphate which comprises reacting tetrachlorethane and oleum in the presence of a catalyst for the reaction, the step which comprises slowly adding tetrachlorethane to oleum of 50 to 65%.

3. In the process for preparing glyoxal sulphate which comprises reacting tetrachlorethane and oleum in the presence of a catalyst for the reaction, the steps which comprise slowly adding tetrachlorethane to oleum of 50 to 65% and bringing the temperature of the reaction to 55–65° C.

4. In the preparation of glyoxal sulphate the steps which comprise slowly adding about 10 parts of tetrachlorethane to about 400 parts of 65% oleum in the presence of mercurous sulphate, while the mass is being brought to a temperature of about 55° C., slowly adding 90 parts of tetrachlorethane to the mass at from about 55 to about 65° C., maintaining that temperature until the reaction is complete, and separating the glyoxal sulphate from the reaction mass.

MELVIN A. PERKINS.